United States Patent
Aronovich

(10) Patent No.: US 9,665,610 B2
(45) Date of Patent: *May 30, 2017

(54) REDUCING DIGEST STORAGE CONSUMPTION BY TRACKING SIMILARITY ELEMENTS IN A DATA DEDUPLICATION SYSTEM

(71) Applicant: INTERNATIONAL BUSINESS MACHINES CORPORATION, Armonk, NY (US)

(72) Inventor: Lior Aronovich, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/790,804

(22) Filed: Jul. 2, 2015

(65) Prior Publication Data
US 2015/0324419 A1 Nov. 12, 2015

Related U.S. Application Data

(63) Continuation of application No. 13/840,438, filed on Mar. 15, 2013, now Pat. No. 9,116,941.

(51) Int. Cl.
G06F 7/00 (2006.01)
G06F 17/30 (2006.01)
G06F 3/06 (2006.01)

(52) U.S. Cl.
CPC ...... *G06F 17/30371* (2013.01); *G06F 3/0641* (2013.01); *G06F 17/30159* (2013.01);
(Continued)

(58) Field of Classification Search
CPC .................. G06F 3/0641; G06F 17/30159
See application file for complete search history.

(56) References Cited

U.S. PATENT DOCUMENTS 8,332,612 B1 * 12/2012 Raizen .................. G06F 3/0608
707/813
8,805,796 B1 * 8/2014 Hu ........................ G06F 3/0608
707/692
(Continued)

FOREIGN PATENT DOCUMENTS

CN 101706825 A 5/2010
CN 101996233 A 3/2011
(Continued)

OTHER PUBLICATIONS

Bhagwat et al., Extreme Binning: Scalable, Parallel De-duplication for Chunk-based File Backup, London, UK.
(Continued)

*Primary Examiner* — Charles Lu
(74) *Attorney, Agent, or Firm* — Griffiths & Seaton PLLC

(57) ABSTRACT

For reducing digests storage consumption in a data deduplication system using a processor device in a computing environment, input data is partitioned into chunks, and the chunks are grouped into chunk sets. Digests are calculated for input data and stored in sets corresponding to the chunk sets. Similarity elements are calculated for the input data and the similarity elements are stored in a similarity search structure, and the number of similarity elements associated with a chunk set which are currently contained in the similarity search structure is maintained for each chunk set.

24 Claims, 9 Drawing Sheets

(52) U.S. Cl.
CPC .. *G06F 17/30303* (2013.01); *G06F 17/30584* (2013.01); *G06F 17/30598* (2013.01); *G06F 17/30876* (2013.01)

(56) References Cited

U.S. PATENT DOCUMENTS

| | | |
|---|---|---|
| 8,825,626 B1 | 9/2014 | Wallace et al. |
| 8,914,338 B1 | 12/2014 | Wallace et al. |
| 2009/0083563 A1 | 3/2009 | Murase |
| 2009/0307251 A1 | 12/2009 | Heller et al. |
| 2010/0094817 A1* | 4/2010 | Ben-Shaul ............ G06F 3/0608 707/697 |
| 2010/0106691 A1* | 4/2010 | Preslan ............... G06F 11/1453 707/674 |
| 2010/0205163 A1 | 8/2010 | Eshghi et al. |
| 2010/0250480 A1 | 9/2010 | Cherkasova et al. |
| 2010/0318759 A1 | 12/2010 | Hamilton et al. |
| 2011/0060876 A1 | 3/2011 | Liu |
| 2011/0099351 A1 | 4/2011 | Condict |
| 2011/0225385 A1 | 9/2011 | Tofano |
| 2011/0246741 A1* | 10/2011 | Raymond ......... G06F 17/30159 711/170 |
| 2011/0307659 A1 | 12/2011 | Hans et al. |
| 2012/0023070 A1 | 1/2012 | Prahlad et al. |
| 2012/0023112 A1 | 1/2012 | Levow et al. |
| 2012/0143715 A1 | 6/2012 | Eshghi et al. |
| 2012/0166401 A1 | 6/2012 | Li et al. |
| 2012/0166448 A1 | 6/2012 | Li et al. |
| 2012/0185612 A1 | 7/2012 | Zhang et al. |
| 2012/0233135 A1 | 9/2012 | Tofano |
| 2012/0290537 A1 | 11/2012 | Smith et al. |
| 2013/0036277 A1 | 2/2013 | Szczepkowski et al. |
| 2013/0060739 A1 | 3/2013 | Kalach et al. |
| 2013/0073529 A1 | 3/2013 | Aronovich et al. |
| 2013/0086009 A1 | 4/2013 | Li et al. |
| 2013/0138620 A1* | 5/2013 | Yakushev ......... G06F 17/30156 707/698 |
| 2014/0115182 A1 | 4/2014 | Sabaa et al. |
| 2014/0188828 A1 | 7/2014 | Hirsch et al. |
| 2014/0222770 A1* | 8/2014 | Lad ..................... E21D 20/02 707/692 |
| 2014/0279951 A1 | 9/2014 | Akirav et al. |
| 2014/0279952 A1 | 9/2014 | Akirav et al. |
| 2014/0279953 A1 | 9/2014 | Aronovich |

FOREIGN PATENT DOCUMENTS

| | | |
|---|---|---|
| CN | 102591946 A | 7/2012 |
| CN | 102880671 A | 1/2013 |
| EP | 1962209 A2 | 8/2008 |

OTHER PUBLICATIONS

Anonymous, Framework for Stream De-duplication using Biased Reservoir-Sampling, Mar. 31, 2012.

* cited by examiner

US 9,665,610 B2

REDUCING DIGEST STORAGE CONSUMPTION BY TRACKING SIMILARITY ELEMENTS IN A DATA DEDUPLICATION SYSTEM

CROSS-REFERENCE TO RELATED APPLICATIONS

This Application is a Continuation of U.S. patent application Ser. No. 13/840,438, filed Mar. 15, 2013, the entirety of which is hereby incorporated by reference.

BACKGROUND OF THE INVENTION

Field of the Invention

The present invention relates in general to computers, and more particularly to reducing digests storage consumption by tracking the numbers of similarity elements in a similarity search structure for removing digests in a data deduplication system in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data are copied again and again, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

In one embodiment, a method is provided for tracking of a number of similarity elements currently in a similarity search structure for removing digests from a repository in a data deduplication system using a processor device in a computing environment. In one embodiment, by way of example only, a deduplication process includes calculating digests for the input data and storing said digests in sets corresponding to chunk sets. Similarity elements are calculated for the input data and the similarity elements are stored in a similarity search structure, and the number of similarity elements associated with each chunk set which are currently contained in the similarity search structure is maintained for each chunk set.

In another embodiment, a computer system is provided for tracking of a number of similarity elements currently in the similarity search structure for removing digests from a repository in a data deduplication system using a processor device, in a computing environment. The computer system includes a computer-readable medium and a processor in operable communication with the computer-readable medium. In one embodiment, by way of example only, the processor calculates digests for the input data and storing said digests in sets corresponding to the chunk sets. Similarity elements are calculated for the input data and the similarity elements are stored in a similarity search structure, and the number of similarity elements associated with each chunk set which are currently contained in the similarity search structure is maintained for each chunk set.

In a further embodiment, a computer program product is provided for tracking of a number of similarity elements currently in the similarity search structure for removing digests from a repository in a data deduplication system in a data deduplication system using a processor device, in a computing environment. The computer-readable storage medium has computer-readable program code portions stored thereon. The computer-readable program code portions include a first executable portion that calculates digests for the input data and storing said digests in sets corresponding to the chunk sets. Similarity elements are calculated for the input data and the similarity elements are stored in a similarity search structure, and the number of similarity elements associated with each chunk set which are currently contained in the similarity search structure is maintained for each chunk set.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
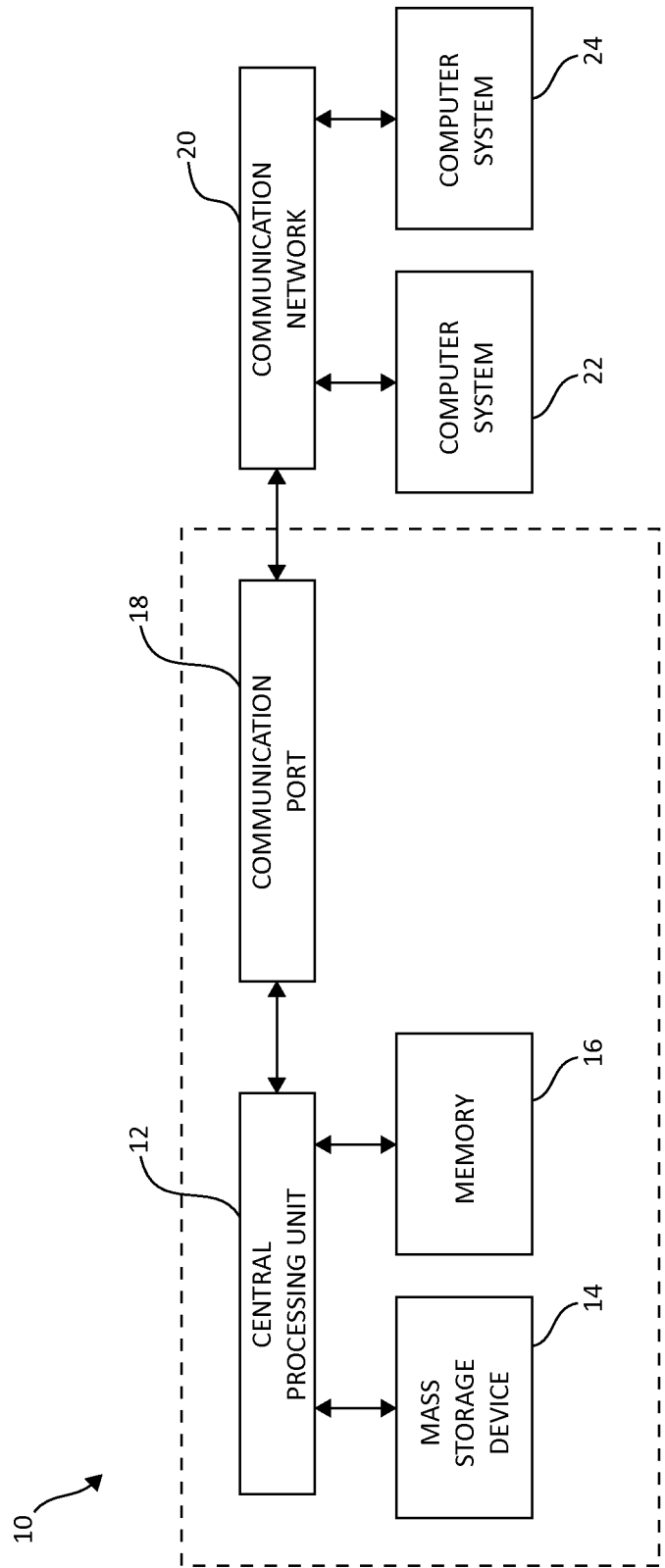
FIG. 1 is a block diagram illustrating a computing system environment having an example storage device in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.). In one embodiment, a deduplication storage system may be based on maintaining a search optimized index of values known as fingerprints or digests, where a (small) fingerprint represents a (larger) block of data in the repository. The fingerprint values may be cryptographic hash values calculated based on the blocks' data. In one embodiment, secure hash algorithm (SHA), e.g. SHA-1 or SHA-256, which are a family of cryptographic hash functions, may be used. Identifying fingerprint matches, using index lookup, enables to store references to data that already exists in a repository.

To provide reasonable deduplication in this approach, the mean size of the data blocks based on which fingerprints are generated must be limited to smaller sizes and may not be too large. The reason being that a change of a bit within a data block will probabilistically change the data block's corresponding fingerprint, and thus having large data blocks makes the scheme more sensitive to updates in the data as compared to having small blocks. A typical data block size may range from 4 KB to 64 KB, depending on the type of application and workload. Thus, by way of example only, small data blocks may range in sizes of up to 64 KB, and large data blocks are those data blocks having a size larger than 64 KB.

To support very large repositories scaling to Petabytes (e.g., repositories scaling to at least one Petabyte), the number of fingerprints to store coupled with the size of a fingerprint (ranging between 16 bytes and 64 bytes), becomes prohibitive. For example, for 1 Petabyte of deduplicated data, with a 4 KB mean data block size, and 32 bytes fingerprint size (e.g. of SHA-256), the storage required to store the fingerprints is 8 Terabytes. Maintaining a search optimized data structure for such volumes of fingerprints is difficult, and requires optimization techniques. However existing optimization techniques do not scale to these sizes while maintaining performance. For this reason, to provide reasonable performance, the supported repositories have to be relatively small (on the order of tens of TB). Even for such smaller sizes, considerable challenges and run-time costs arise due to the large scale of the fingerprint indexes, that create a bottle-neck in deduplication processing.

To solve this problem, in one embodiment, a deduplication system may be based on a two step approach for searching data patterns during deduplication. In the first step, a large chunk of incoming data (e.g. a few megabytes) is searched in the repository for similar (rather than identical) data chunks of existing data, and the incoming data chunk is partitioned accordingly into intervals and paired with corresponding (similar) repository intervals. In the second step, a byte-wise matching algorithm is applied on pairs of similar intervals, to identify identical sub-intervals, which are already stored in a repository of data. The matching algorithm of the second step relies on reading all the relevant similar data in the repository in order to compare it byte-wise to the input data.

Yet, a problem stemming from a byte-wise comparison of data underlying the matching algorithm of the second step, is that data of roughly the same size and rate as the incoming data should be read from the repository, for comparison purposes. For example, a system processing 1 GB of incoming data per second, should read about 1 GB of data per second from the repository for byte-wise comparison. This requires substantially high capacities of I/O per second of the storage devices storing the repository data, which in turn increases their cost.

Additional trends in information technology coinciding with the above problem are the following: (1) Improvements in the computing ability by increasing CPU speeds and the number of CPU cores. (2) Increase in disk density, while disk throughput remains relatively constant or improving only modestly. This means that there are fewer spindles relative to the data capacity, thus practically reducing the overall throughput. Due to the problem specified above, there is a need to design an alternative solution, to be integrated in a two step deduplication system embodiment specified above, that does not require reading from the repository in high rates/volumes.

Therefore, additional embodiments, by way of example only, address this problem, as well as shift resource consumption from disks to the CPUs, to benefit from the above trends. The embodiments described herein are integrated within the two step and scalable deduplication embodiments described above, and use a similarity search to focus lookup of digests during deduplication. In one embodiment, a global similarity search is used as a basis for focusing the search for digests of repository data that is most likely to match input data.

The embodiments described herein significantly reduce the capacity of I/O per second required of underlying disks, benefit from the increases in computing ability and in disk density, and considerably reduce the costs of processing, as well as maintenance costs and environmental overhead (e.g. power consumption).

In one embodiment, input data is segmented into small segments (e.g. 4 KB) and a digest (a cryptographic hash value, e.g. SHA1) is calculated for each such segment. First, a similarity search algorithm, as described above, is applied on an input chunk of data (e.g. 16 MB), and the positions of the most similar reference data in the repository are found.

These positions are then used to lookup the digests of the similar reference data. The digests of all the data contained in the repository are stored and retrieved in a form that corresponds to their occurrence in the data. Given a position of a section of data contained in the repository, the data's associated digests are efficiently located in the repository and retrieved. Next, these reference digests are loaded into memory, and instead of comparing data to find matches, the input digests and the loaded reference digests are matched.

Thus, in one embodiment, a new fundamental approach for a data deduplication system, integrates a scalable two step approach of similarity search followed by a search of identical matching segments, that was first based on byte-wise data comparison, with a considerably more efficient and cost effective digest/fingerprint based matching algorithm, which enables to read only a small fraction (e.g., 1%) of the volume previously required. With the new present invention specified herein, the deduplication system preserves its unique scalability to very large data repositories, while gaining considerable additional efficiency, improving performance and reducing the costs of the underlying hardware.

In one embodiment, by way of example only, the term "similar data" may be referred to as: for any given input data, data which is similar to the input data is defined as data which is mostly the same (i.e. not entirely but at least 50% similar) as the input data. By looking at the data in a binary view (perspective), this means that similar data is data where most (i.e. not entirely but at least 50% similar) of the bytes are the same as the input data.

In one embodiment, by way of example only, the term "similarity search" may be referred to as the process of searching for data which is similar to input data in a repository of data. In one embodiment, this process may be performed using a search structure of similarity elements, which is maintained and searched within.

In one embodiment, by way of example only, the term "similarity elements" refers to computational elements that may be calculated based on the data and facilitate a global search for data which is similar to input data in a repository of data. In general, one or more similarity elements are calculated, and represent, a large (e.g. at least 16 MB) chunk of data.

Thus, the various embodiments described herein provide various solutions for digest retrieval based on a similarity search in deduplication processing in a data deduplication system using a processor device in a computing environment. In one embodiment, by way of example only, input data is partitioned into fixed sized data chunks. Similarity elements, digest block boundaries and digest values are calculated for each of the fixed sized data chunks. Matching similarity elements are searched for in a search structure (i.e. index) containing the similarity elements for each of the fixed sized data chunks in a repository of data. Positions of similar data are located in a repository. The positions of the similar data are used to locate and load into the memory stored digest values and corresponding stored digest block boundaries of the similar data in the repository. It should be noted that in one embodiment the positions may be either physical or logical (i.e. virtual). The positions are of data inside a repository of data. An important property of a 'position' is that given a position (physical or logical) in the repository's data, the data in that position can be efficiently located and accessed. The digest values and the corresponding digest block boundaries of the input data are matched with the stored digest values and the corresponding stored digest block boundaries to find data matches.

Thus, the various embodiments described herein provide various solutions for digest retrieval based on a similarity search in deduplication processing in a data deduplication system using a processor device in a computing environment. In one embodiment, by way of example only, input data is partitioned into fixed sized data chunks. Similarity elements, digest block boundaries and digest values are calculated for each of the fixed sized data chunks. Matching similarity elements are searched for in a search structure (i.e. index) containing the similarity elements for each of the fixed sized data chunks in a repository of data. Positions of similar data are located in a repository. The positions of the similar data are used to locate and load into the memory stored digest values and corresponding stored digest block boundaries of the similar data in the repository. The digest values and the corresponding digest block boundaries of the input data are matched with the stored digest values and the corresponding stored digest block boundaries to find data matches.

In one embodiment, the present invention provides a solution for utilizing a similarity search to load into memory relevant digests from the repository, for efficient deduplication processing. In a data deduplication system, deduplication is performed by partitioning the data into large fixed sized chunks, and for each chunk calculating similarity elements, digest blocks and corresponding digest values. The data deduplication system searches for matching similarity elements in a search structure of similarity elements, and finds the positions of similar data in the repository. The data deduplication system uses these positions of similar data to locate and load into memory stored digests of the similar repository data, and then matches input and repository digest values to find data matches.

In one embodiment, the present invention provides for efficient calculation of both similarity search elements and segmentation (i.e. boundaries) of digest blocks, using a single linear calculation of rolling hash values. In a data deduplication system, the input data is partitioned into chunks, and for each chunk a set of rolling hash values is calculated. A single linear scan of the rolling hash values produces both similarity search elements and boundaries of the digest blocks of the chunk. Each rolling hash value corresponds to a consecutive window of bytes in byte offsets. The similarity search elements are used to search for similar data in the repository. The digest blocks segmentation is used to calculate digest values of the chunk for digests matching. Each rolling hash value contributes to the calculation of the similarity elements and the calculation of the digest blocks segmentations. Each rolling hash value is discarded after contributing to the calculation.

Thus, as described above, the deduplication approach of the present invention uses a two step process for searching data patterns during deduplication. In the first step, a large chunk of incoming data (e.g. 16 megabytes "MB") is searched in the repository for similar (rather than identical) chunks of existing data, and the incoming chunk is partitioned accordingly into intervals, and paired with corresponding (similar) repository intervals. The similarity search structure (or "index") used in the first step is compact and simple to maintain and search within, because the elements used for a similarity search are very compact relative to the data they represent (e.g. 16 bytes representing 4 megabytes). Further included in the first step, in addition to a calculation of similarity elements, is a calculation of digest segments and respective digest values for the input chunk of data. All these calculations are based on a single calculation of rolling hash values. In the second step, reference digests of the similar repository intervals are retrieved, and then the input digests are matched with the reference digests, to identify data matches.

A significant problem arising in similarity based deduplication, is the size of the storage space consumed by digests stored in a repository. In one embodiment, for similarity based deduplication, a relatively small average digest segment size is used (e.g. 1 KB-2 KB). The reason for that is twofold. First, a small digest segment size provides significant benefits: it enables to achieve higher resolution during deduplication; it is less sensitive to modifications in the data; and it enables to lose less deduplication potential at the edges of each data mismatch. For these reasons, a small digest segment size improves the deduplication results. Second, in similarity-based deduplication, there is no massive index keyed by the digest values. Instead, there is a compact similarity search structure. The absence of such a digests index, which commonly does not enable to support small digest segment sizes for large repositories, enables the similarity based deduplication approach to support small digest segment sizes also for considerably large repositories.

The ability to support small digest segment sizes enables the similarity based deduplication approach to gain a considerable advantage over other deduplication approaches. In the similarity based deduplication approach the digests are stored in a linear form, which is independent of the deduplicated form by which the data these digests describe is stored, and in the sequence of their occurrence in the data. This method of storage enables efficient retrieval of linear sections of digests, independent of fragmentation characterizing deduplicated storage forms, and thus low on input/output (JO) and computational resource consumption. However, while in this approach retrieval of digests is efficient, the amount of storage consumed by the stored digests is considerably large and potentially prohibitive.

To illustrate the large amount of storage consumed by digests, consider the following example: Assuming a 1 KB average digest segment size, a digest value of size 32 bytes (e.g. SHA-256) and a position field of size 8 bytes, then the digests will consume 3.90625% of the data they describe. Considering a factoring ratio of 1:8 and a compression ratio of 1:2 (both are common in backup environments), then the digests will consume additional physical storage space of 8×2×3.90625%=62.5% of the physical data they describe. Thus for example, for stored data of physical size 1024 TB, the additional physical storage consumed by digests would be 640 TB. This is clearly prohibitive. As such, this is a make-or-break problem for the similarity based deduplication approach. Therefore, a solution is required to enable reducing the storage consumed by digests in similarity based deduplication systems. In one embodiment, a solution is described herein, providing all the benefits of small digest segment sizes, while keeping the storage consumed by the digests considerably low.

In one embodiment, in the similarity based deduplication approach described herein, a stream of input data is partitioned into chunks (e.g. of size 16 MB), and each chunk is processed in two main steps. In the first step a similarity search process is applied, and positions of the most similar reference data in the repository are found. Within this step both similarity search elements and digest segments boundaries are calculated for the input chunk, based on a single linear calculation of rolling hash values. Digest values are calculated for the input chunk based on the produced segmentation, and stored in memory in the sequence of their occurrence in the input data. The positions of similar data are then used to lookup the digests of the similar reference data and load these digests into memory, also in a sequential form. Then, the input digests are matched with the reference digests to form data matches.

When deduplication of an input chunk of data is complete, the digests associated with the input chunk of data are stored in the repository, to serve as reference digests for subsequent input data. The digests are stored in a linear form, which is independent of the deduplicated form by which the data that these digests describe is stored, and in the sequence of their occurrence in the data. This method of storage enables efficient retrieval of sections of digests, independent of fragmentation characterizing deduplicated storage forms, and thus low on IO and computational resource consumption. However, without an appropriate solution, the storage consumption of the digests will become prohibitive, as elaborated previously.

Thus, as described herein, a key idea underlying the present invention is that if the digests stored in a repository will be correlative to the factored size of the data in the repository, rather than to the total (also denoted as nominal) data size in the repository, then the digests consumed space is sustainable. In the above example, if the stored digests will be correlative to the factored size of the data, then the digests will consume 2×3.90625%=7.8125% of the physical storage space, instead of 62.5%. The saving in this example is 54.6875% of the physical storage space. Namely, for a 1024 TB physical repository size, the total storage savings is 560 TB. The formula for the storage saving percent of the physical repository size is: ((1/factoring ratio)−1)×(1/compression ratio)×digests ratio.

At this point, a solution is required to address the issue of how to transform the digests stored to be correlative to the factored size of the data in a repository (rather than correlative to the nominal data size). To solve this problem, a further key solution is introduced. In one embodiment, when deduplication of a chunk of input data is complete, the matches formed within the deduplication process to repository data are known. In a backup environment, the probability that subsequent input data will form large matches with the latest ingested data is considerably higher than the probability that subsequent input data will form large matches with repository data that was already matched with later ingested data. For this reason, similarity elements of repository data that was already matched with later ingested data, may be removed from the similarity search structure, so that references to such data will not be produced in further similarity search processes. Therefore, a key solution in the present invention is that by removing digests of data that was already matched with later ingested data, the digests stored in a repository become correlative to the size of the data patterns which are unique in the repository, or in other words, the digests stored in a repository become correlative to the size of the factored data in the repository (instead of the size of the nominal data).

In one embodiment, the present invention provides additional beneficial properties. With the present invention, the storage saving results are predictable, since these results depend on a deterministic digests to data ratio and on the factoring and compression ratios, which can be predicted. This facilitates simpler storage management. Another beneficial property is that the run-time costs of the present invention are very low. This is because tracking of repository data that was already matched, and removing sequences of digests, are efficient operations in similarity based deduplication.

Thus, in one embodiment, the present invention reduces the storage space consumed by digests to be correlative to the factored repository size, which is a fraction of the original storage consumption had it been correlative to the nominal repository size. This solution solves a critical storage problem in similarity based deduplication. In one embodiment, the present invention enables to gain the deduplication benefits of small digest segment sizes, while keeping the scalability and efficiency of the deduplication system.

In one embodiment, the present invention removes digests of redundant repository data, to make the digests storage consumption correlative to the factored size of the data in the repository, rather than to the total (nominal) data size in the repository. In one embodiment, by way of example only, a deduplication process includes calculating digest values for input data. The digests values are used to locate matches with data stored in a repository. The digest values are stored in the repository. The digest values of the data stored in the repository that is determined to be redundant with the input data are removed. The input digest values are stored in a repository linearly in the sequence of their occurrence in the data. The input digest values are stored in a repository in a form which is independent of the form by which the data that these digest values describe is stored. The repository data that is used to produce matches with input data is determined to be redundant with the input data.

In one embodiment, the present invention partitions the nominal data into chunks (e.g. of size 16 MB), and the chunks are grouped into sets of predefined number of chunks, denoted as chunk sets. In one embodiment, the present invention keeps track of the number of similarity elements currently in the similarity search structure, associated with each chunk set in the repository, and when this number of a specific chunk set becomes lower than a threshold, the digests associated with that chunk set are removed from the repository. In one embodiment, by way of example only, a deduplication process includes calculating digests for the input data and storing said digests in sets corresponding to the chunk sets. Similarity elements are calculated for the input data and the similarity elements are stored in a similarity search structure. For each chunk set, the number of similarity elements associated with the chunk set, which are currently contained in the similarity search structure, is maintained. When this number of a specific chunk set becomes lower than a threshold, the digests set associated with that chunk set is removed from the repository.

In one embodiment, the chunk sets are non-overlapping and cover all the chunks. The similarity elements are used to find repository data, which is similar to the input data, and input and repository digests are used to calculate data matches. The similarity elements of repository data that was matched with later ingested data are removed from the similarity search structure. For each chunk set enclosing matched repository data, the number of similarity elements, which were removed from the similarity search structure for that chunk set, is subtracted from the maintained number of similarity elements associated with the chunk set in the similarity search structure.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
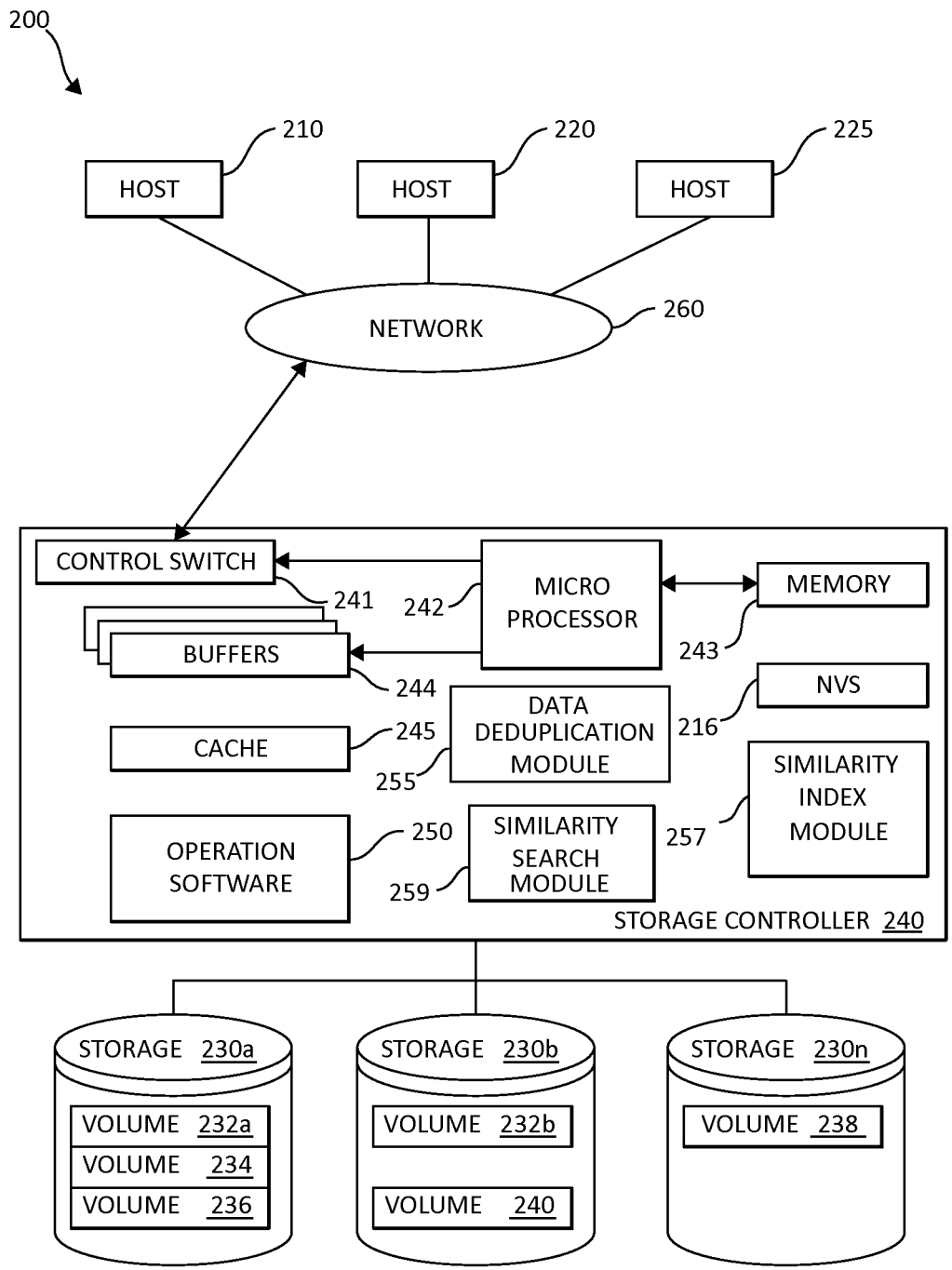
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data duplication module 255, a similarity index module 257 (e.g., a similarity search structure), and a similarity search module 259. The data duplication module 255, the similarity index module 257, and the similarity search module 259 may work in conjunction with each and every component of the storage controller 240, the hosts 210, 220, 225, and storage devices 230. The data duplication module 255, the similarity index module 257, and the similarity search module 259 may be structurally one complete module or may be associated and/or included with other individual modules. The data duplication module 255, the similarity index module 257, and the similarity search module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the similarity index module 257, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, data duplication module 255, the similarity index module 257, and the similarity search module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the data duplication module 255, the similarity index module 257, and the similarity search module 259 may also be located in the cache 245 or other components. As such, the data duplication module 255, the similarity index module 257, and the similarity search module 259 maybe used as needed, based upon the storage architecture and users preferences.

As mentioned above, in one embodiment, the input data is partitioned into large fixed size chunks (e.g. 16 MB), and a similarity search procedure is applied for each input chunk. A similarity search procedure calculates compact similarity elements, which may also be referred to as similarity elements, based on the input chunk of data, and searches for matching similarity elements stored in a compact search structure (i.e. index) in the repository. The size of the similarity elements stored per each chunk of data is typically 32 bytes (where the chunk size is a few megabytes), thus making the search structure storing the similarity elements very compact and simple to maintain and search within.

The similarity elements are calculated by calculating rolling hash values on the chunk's data, namely producing a rolling hash value for each consecutive window of bytes in a byte offset, and then selecting specific hash values and associated positions (not necessarily the exact positions of these hash values) to be the similarity elements of the chunk.

One important aspect and novelty provided by the present invention is that a single linear calculation of rolling hash values, which is a computationally expensive operation, serves as basis for calculating both the similarity elements of a chunk (for a similarity search) and the segmentation of the chunk's data into digest blocks (for finding exact matches). Each rolling hash value is added to the calculation of the similarity elements as well as to the calculation of the digest blocks segmentation. After being added to the two calculations, a rolling hash value can be discarded, as the need to store the rolling hash values is minimized or eliminated. This algorithmic element provides significant efficiency and reduction of CPU consumption, as well as considerable performance improvement.

In one embodiment, the similarity search procedure of the present invention produces two types of output. The first type of output is a set of positions of the most similar reference data in the repository. The second type of output is the digests of the input chunk, comprising of the segmentation to digest blocks and the digest values corresponding to the digest blocks, where the digest values are calculated based on the data of the digest blocks.

In one embodiment, the digests are stored in the repository in a form that corresponds to the digests occurrence in the data. Given a position in the repository and size of a section of data, the location in the repository of the digests corresponding to that interval of data is efficiently determined. The positions produced by the similarity search procedure are then used to lookup the stored digests of the similar reference data, and to load these reference digests into memory. Then, rather than comparing data, the input digests and the loaded reference digests are matched. The matching process is performed by loading the reference digests into a compact search structure of digests in memory, and then for each input digest, querying the search structure of digests for existence of that digest value. Search in the search structure of digests is performed based on the digest values. If a match is found, then the input data associated with that digest is determined to be found in the repository and the position of the input data in the repository is determined based on the reference digest's position in the repository. In this case, the identity between the input data covered by the input digest, and the repository data covered by the matching reference digest, is recorded. If a match is not found then the input data associated with that digest is determined to be not found in the repository, and is recorded as new data. In one embodiment, the similarity search structure is a global search structure of similarity elements, and a memory search structure of digests is a local search structure of digests in memory.

Figure 3:
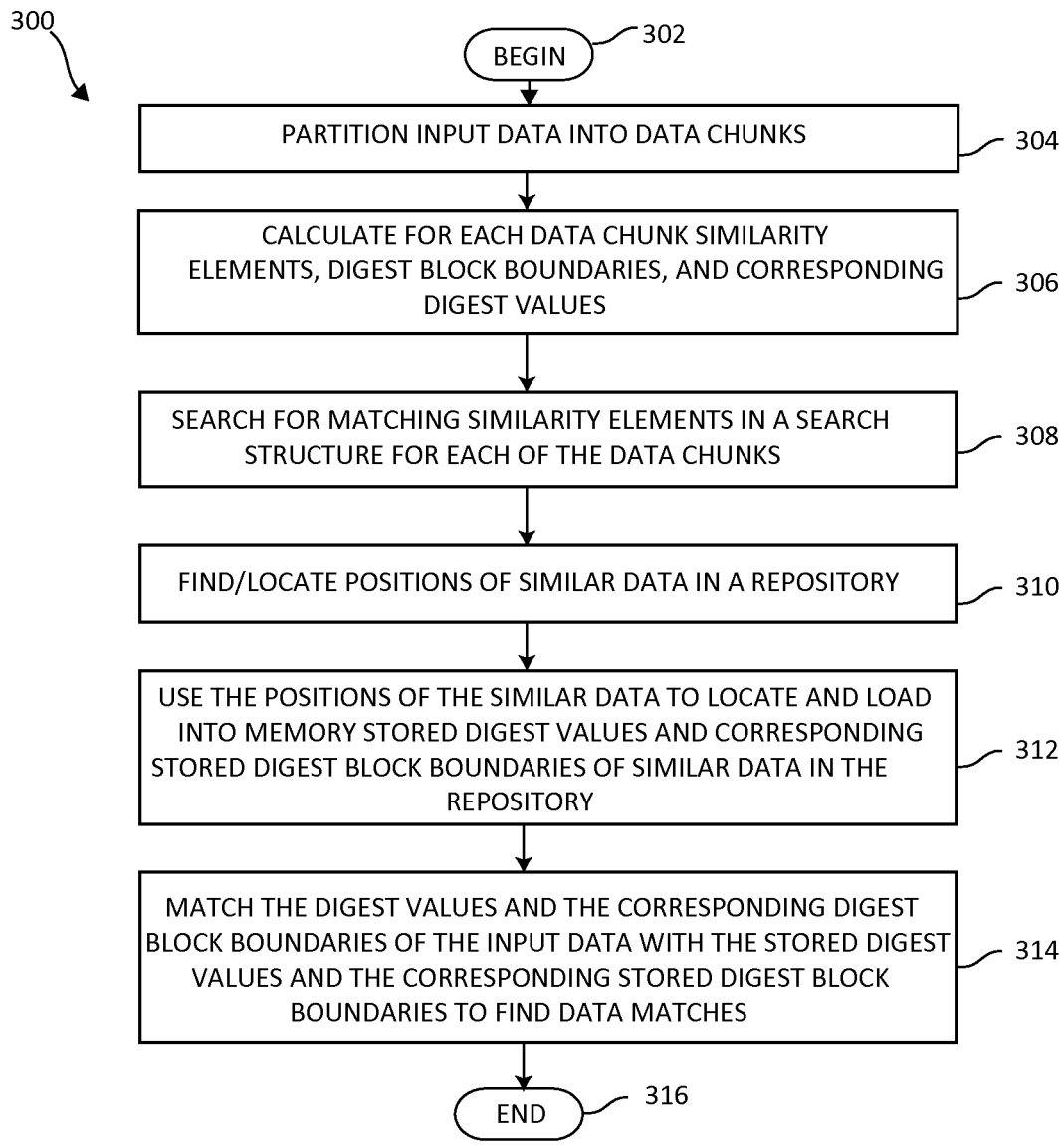
FIG. 3 is a flowchart illustrating an exemplary method for digest retrieval based on similarity search in deduplication processing in a data deduplication system in which aspects of the present invention may be realized.

FIG. 3 is a flowchart illustrating an exemplary method 300 for digest retrieval based on similarity search in deduplication processing in a data deduplication system in which aspects of the present invention may be realized. The method 300 begins (step 302). The method 300 partitions input data into data chunks (step 304). The input data may be partitioned into fixed sized data chunks. The method 300 calculates, for each of the data chunks, similarity elements, digest block boundaries, and corresponding digest values are calculated (step 306). The method 300 searches for matching similarity elements in a search structure (i.e. index) for each of the data chunks (which may be fixed size data chunks) (step 308). The positions of the similar data in a repository (e.g., a repository of data) are located (step 310). The method 300 uses the positions of the similar data to locate and load into memory stored digest values and corresponding stored digest block boundaries of the similar data in the repository (step 312). The method 300 matches the digest values and the corresponding digest block boundaries of the input data with the stored digest values and the corresponding stored digest block boundaries to find data matches (step 314). The method 300 ends (step 316).

Figure 4:
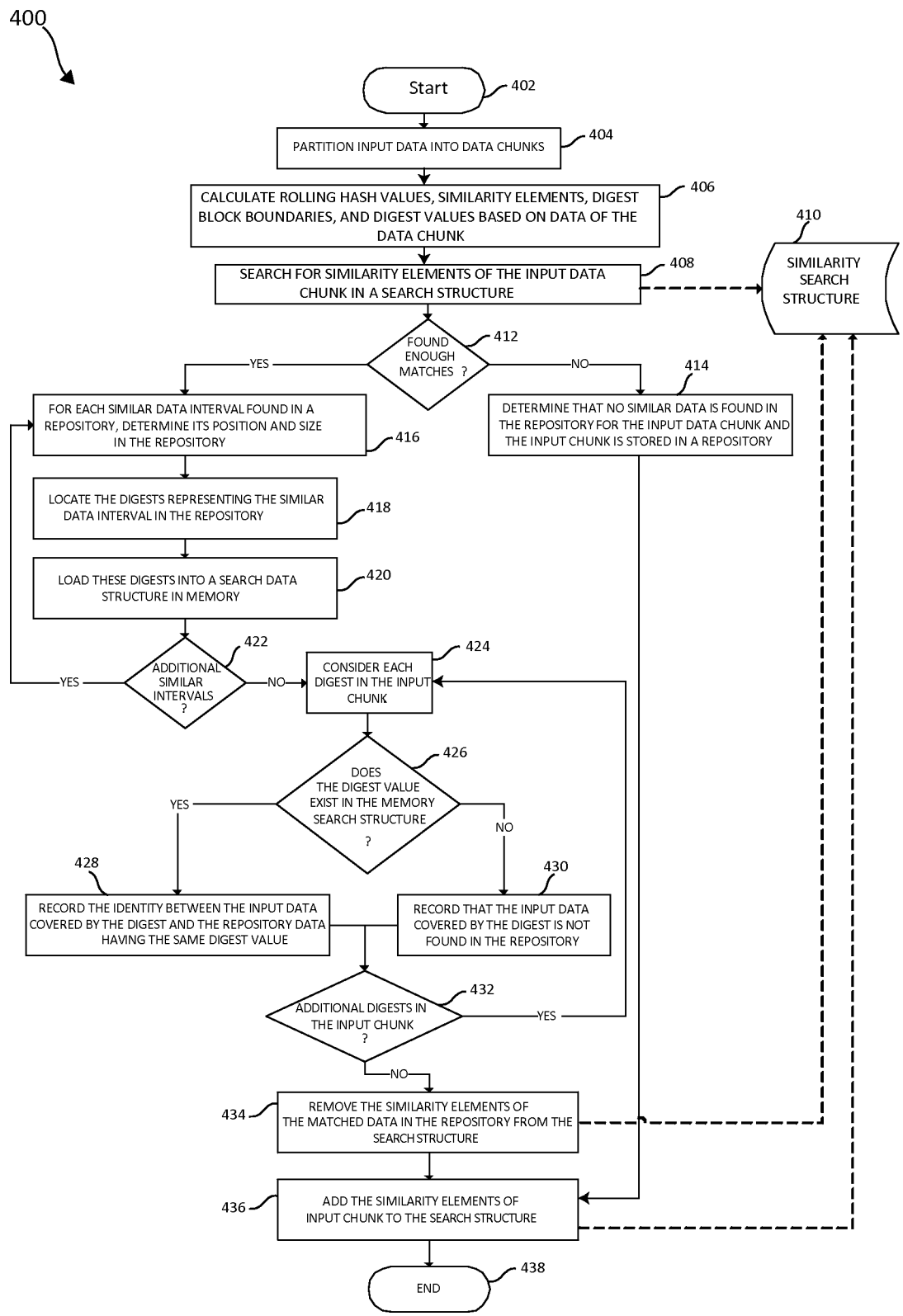
FIG. 4 is a flowchart illustrating an exemplary alternative method for digest retrieval based on similarity search in deduplication processing in a data deduplication system in which aspects of the present invention may be realized.

FIG. 4 is a flowchart illustrating an exemplary alternative method 400 for digest retrieval based on similarity search in deduplication processing in a data deduplication system in which aspects of the present invention may be realized. The method 400 begins (step 402). The method 400 partitions the input data into chunks (e.g., partitions the input data into large fixed size chunks) (step 404), and for an input data chunk calculates rolling hash values, similarity elements, digest block boundaries, and digest values based on data of the input data chunk (step 406). The method 400 searches for similarity elements of the input data chunk in a similarity search structure (i.e. index) (step 408 and 410). The method 400 determines if there are enough or a sufficient amount of matching similarity elements (step 412). If not enough matching similarity elements are found then the method 400 determines that no similar data is found in the repository for the input data chunk, and the data of the input chunk is stored in a repository (step 414) and then the method 400 ends (step 438). If enough similarity elements are found, then for each similar data interval found in a repository, the method 400 determines the position and size of each similar data interval in the repository (step 416). The method 400 locates the digests representing the similar data interval in the repository (step 418). The method 400 loads these digests into a search data structure of digests in memory (step 420). The method 400 determines if there are any additional similar data intervals (step 422). If yes, the method 400 returns to step 416. If no, the method 400 considers each digest of the input data chunk (step 424). The method 400 determines if the digest value exists in the memory search structure of digests (step 426). If yes, the method 400 records the identity between the input data covered by the digest and the repository data having the matching digest value (step 428). If no, the method 400 records that the input data covered by the digest is not found in the repository (step 430). From both steps 428 and 430, the method 400 determines if there are additional digests of the input data chunk (step 432). If yes, the method 400 returns to step 424. If no, method 400 removes the similarity elements of the matched data in the repository from the similarity search structure (step 434 and step 410). The method 400 adds the similarity elements of the input data chunk to the similarity search structure (step 436). The method 400 ends (step 438).

Figure 5:
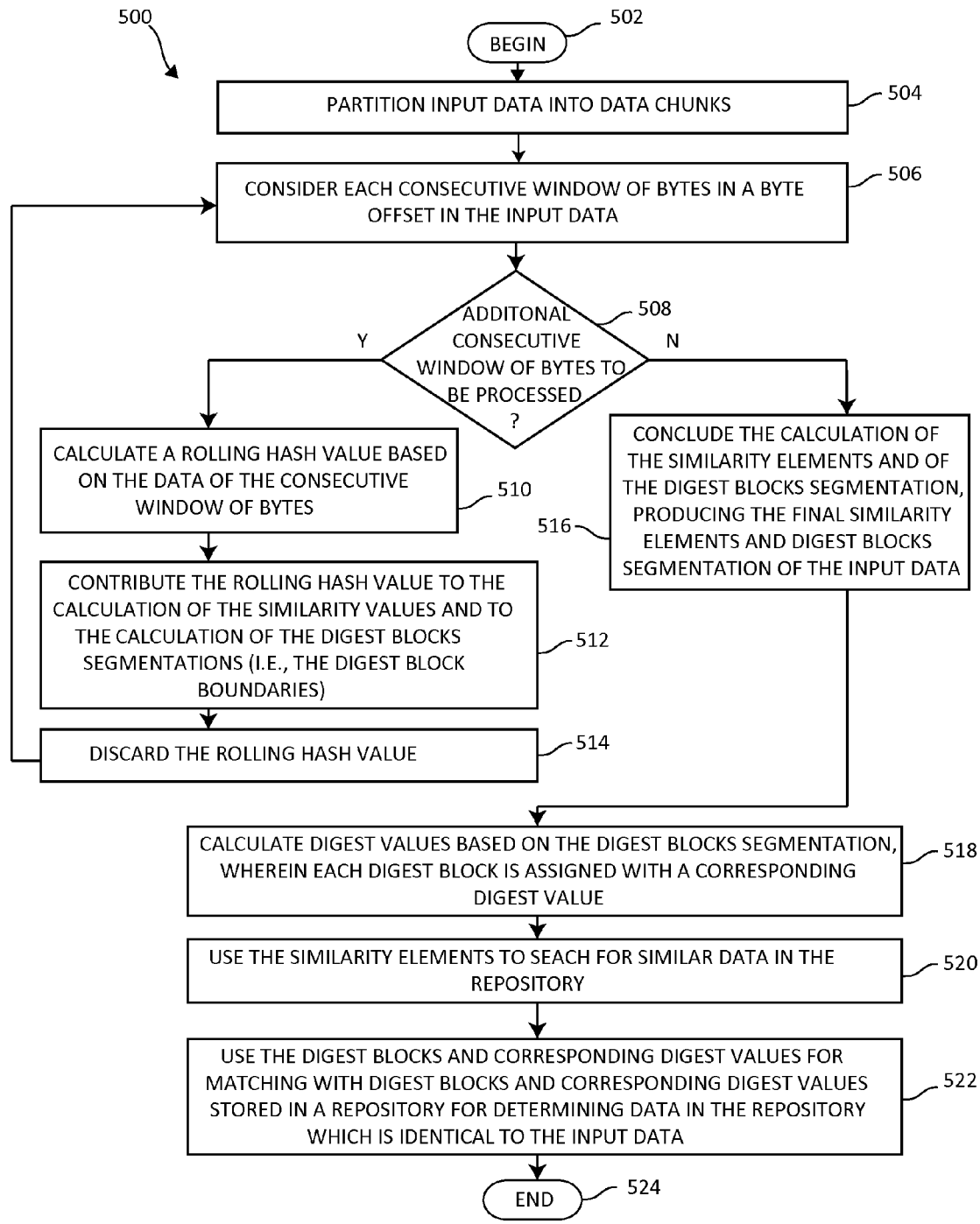
FIG. 5 is a flowchart illustrating an exemplary method for efficient calculation of both similarity search values and boundaries of digest blocks using a single linear calculation of rolling hash values in a data deduplication system in which aspects of the present invention may be realized.

FIG. 5 is a flowchart illustrating an exemplary method 500 for efficient calculation of both similarity search values and boundaries of digest blocks using a single linear calculation of rolling hash values in a data deduplication system in which aspects of the present invention may be realized. The method 500 begins (step 502). The method 500 partitions input data into data chunks (steps 504). The data chunks may be fixed sized data chunks. The method 500 considers each consecutive window of bytes in a byte offset in the input data (step 506). The method 500 determines if there is an additional consecutive window of bytes to be processed (step 508). If yes, the method 500 calculates a rolling hash value based on the data of the consecutive window of bytes (step 510). The method 500 contributes the rolling hash value to the calculation of the similarity values and to the calculation of the digest blocks segmentations (i.e., the digest block boundaries) (step 512). The method 500 discards the rolling hash value (step 514), and returns to step 506. If no, the method 500 concludes the calculation of the similarity elements and of the digest blocks segmentation, producing the final similarity elements and digest blocks segmentation of the input data (step 516). The method 500 calculates digest values based on the digest blocks segmentation, wherein each digest block is assigned with a corresponding digest value (step 518). The similarity elements are used to search for similar data in the repository (step 520). The digest blocks and corresponding digest values are used for matching with digest blocks and corresponding digest values stored in a repository for determining data in the repository which is identical to the input data (step 522). The method 500 ends (step 524).

Figure 6:
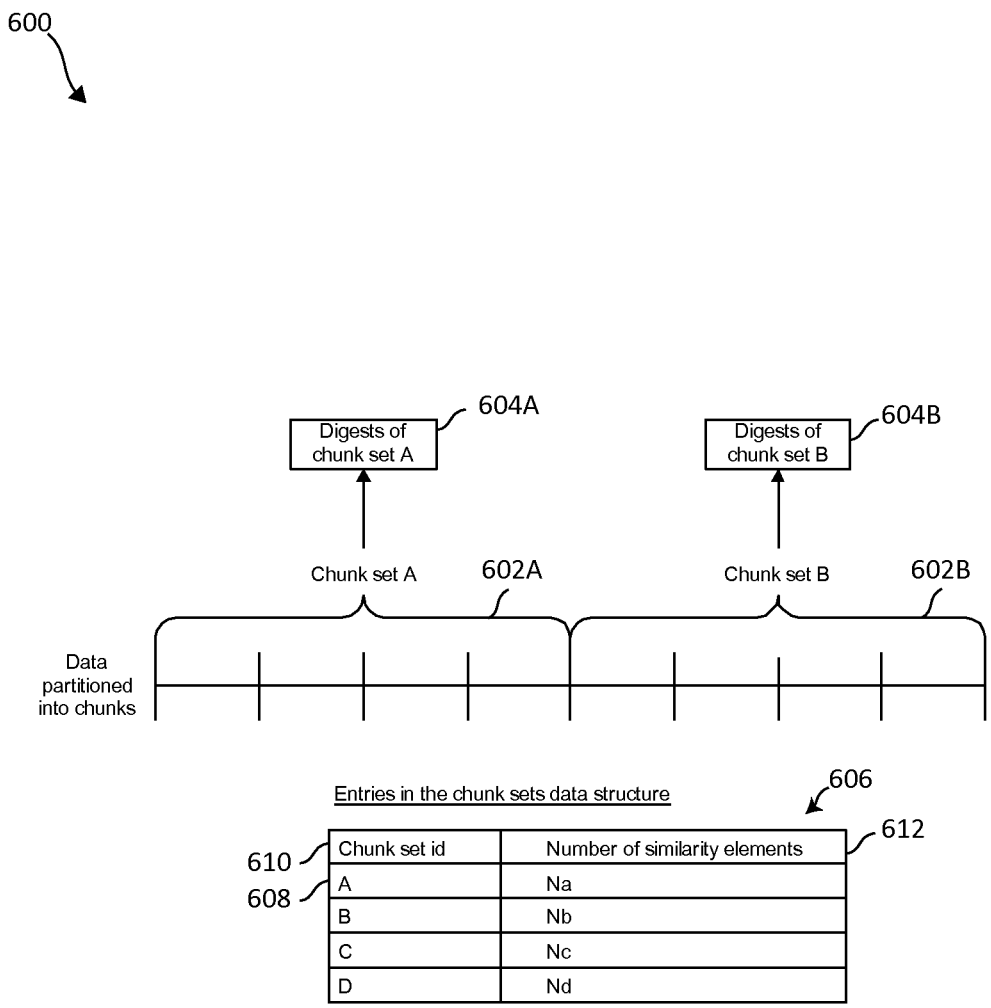
FIG. 6 is a block diagram illustrating a compact data structure containing a record for each chunk set in which aspects of the present invention may be realized.

Turning now to FIGS. 6-9, nominal data is partitioned into chunks (e.g. of size 16 MB), and the chunks are grouped into sets of predefined number of chunks, denoted as chunk sets. The chunk sets are non-overlapping, and cover all the chunks. The number of chunks in a set is at least 1, but is normally defined to be larger, e.g. 16 chunks (thus in this example a chunk set represents 256 MB of data). The significance of the chunk sets is twofold. First, for each chunk set, relevant information is maintained to enable determination of digests for removal. Second, digests are stored in the repository in physical sets that correspond to the chunk sets. Namely, for each chunk set there is an associated digests set stored in the repository. These digests sets can be efficiently located, retrieved, and removed when required, which architecture is illustrated in FIG. 6 below.

FIG. 6 is a block diagram illustrating a compact data structure 600 containing a record for each chunk set in which aspects of the present invention may be realized. A compact data structure 600, denoted as the chunk sets data structure 606, contains a record 608 for each chunk set 602, where each record 608 (records for chunk set A, B, C, and D) includes an identification of the chunk set 610, and the number of similarity elements 612 associated with the chunk set 602, which are currently contained in the similarity search structure. For example, the records of the chunk sets 602 illustrate that the chunk set identification (ID) for chunk set A has the number Na of similarity elements, chunk set B has the number Nb of similarity elements, chunk set C has the number Nc of similarity elements, and chunk set D has the number Nd of similarity elements. As mentioned above, digests 604 (illustrated as 604A and 604B) are stored in the repository in physical sets that correspond to the chunk sets 602. Namely, for each chunk set 602 there is an associated digests set 604 stored in the repository. These digests sets 604 can be efficiently located, retrieved, and removed when required. Considering 16 bytes per record (without any compaction), then in the above example this data structure contains 1 byte for each 16 MB of data, which is very compact. For example, for a repository of 1 PB physical storage and a deduplication ratio of 1:16 (i.e. 16 PB of nominal data), the size of this data structure is 1 GB.

In one embodiment, during deduplication processing of the chunks in an input chunk set, a record is kept in memory of the number of similarity elements that are inserted into the similarity search structure for the chunks in the chunk set. When deduplication processing of the chunk set is complete, the total number of similarity elements that were inserted into the similarity search structure for the chunk set is therefore known. At this point, a record is added to the chunk sets data structure, containing an identification of the chunk set and the number of similarity elements that were inserted into the similarity search structure for the chunk set.

Further, during deduplication processing of a chunk set, an additional piece of information is maintained in memory. This information is a list of repository chunk sets that enclose repository intervals based on which the deduplication process of the chunks in the current chunk set produced data matches. For each repository interval that was matched with input chunks, the identification of its enclosing chunk set is known. For each data match that was produced, the deduplication process calculates the similarity elements that occur in the matched section of repository data, and then removes these similarity elements from the similarity search structure. The total number of similarity elements that were removed from the similarity search structure, for each repository chunk set enclosing matched repository data, are then updated in the list maintained for the current chunk set. Namely, each entry in the list contains an identification of a chunk set enclosing repository data that was matched with the current chunk set, as well as the number of similarity elements of the repository chunk set that were removed from the similarity search structure (by the deduplication process of the current chunk set).

When deduplication processing of a current chunk set is complete, the list of repository chunk sets is scanned, and for each entry, the number of similarity elements which were removed from the similarity search structure for the specific repository chunk set (specified in the entry), is then subtracted from the number of similarity elements recorded for that specific chunk set in the chunk sets data structure (illustrated in FIG. 6). The result of this subtraction is the current number of similarity elements of that specific chunk set in the similarity search structure. This number is updated in the chunk set's record within the chunk sets data structure. By applying this process, the records of the relevant chunk sets in the chunk set data structure, now reflect the updated number of similarity elements of each chunk set in the similarity search structure. Within this process, the resulting number of similarity elements for each repository chunk set being processed, is evaluated. If this number is lower than a predefined threshold, then the representation of that repository chunk set in the similarity search structure is determined to be sufficiently low, and the process therefore proceeds to remove the digests associated with that chunk set from the repository. This enables the size of the digests stored in a repository to be maintained correlative to the factored data size. The threshold value, with which the resulting numbers of similarity elements for each repository chunk set are compared, can be specific for each repository chunk set, rather than fixed for all chunk sets. This threshold can be specified by means of a percent out of the initial number of similarity elements inserted per chunk set.

Figure 7:
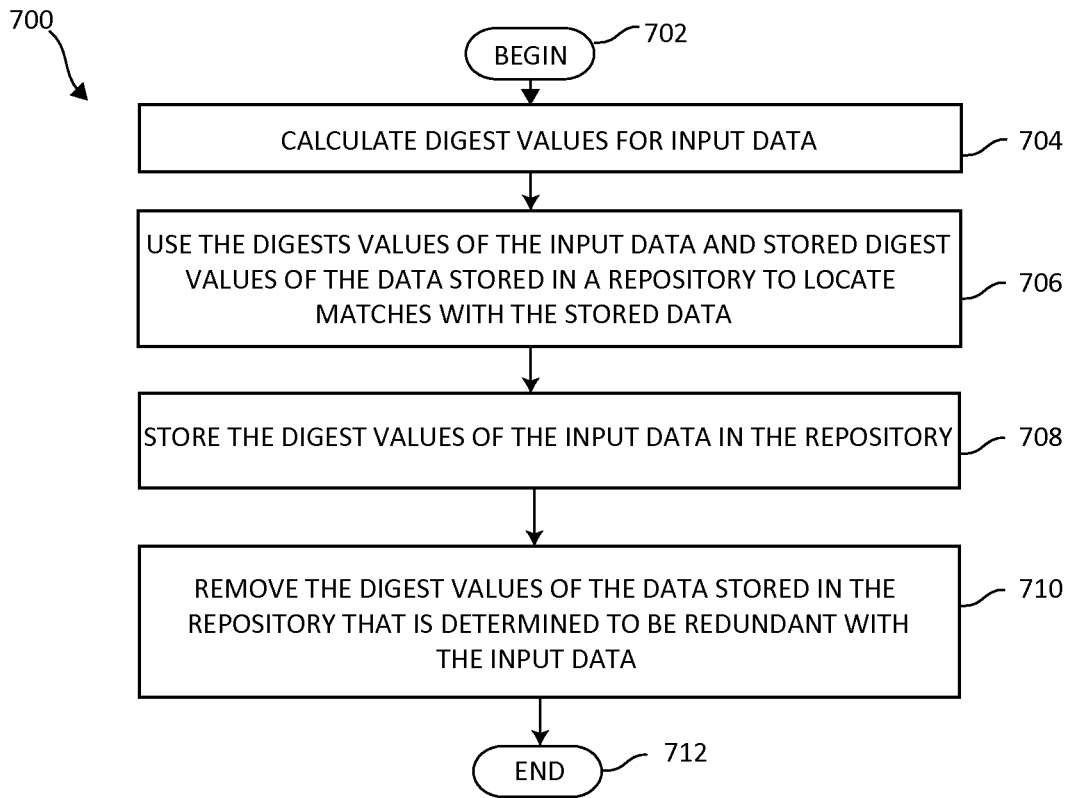
FIG. 7 is a flowchart illustrating an exemplary method for reducing digests storage consumption in a data deduplication system in which aspects of the present invention may be realized.

In one embodiment, as illustrated in FIG. 7, the present invention removes digests of redundant repository data, to make the digests storage consumption correlative to the factored size of the data in the repository, rather than to the total (nominal) data size in the repository. In one embodiment, by way of example only, a deduplication process includes calculating digest values for input data. The digest values of the input data and stored digest values of data stored in a repository are used to locate matches with the stored data. The digest values of the input data are stored in the repository. The digest values of the data stored in the repository that is determined to be redundant with the input data are removed. The digest values of the input data are stored in a repository linearly in the sequence of their occurrence in the data. The digest values of the input data are stored in a repository in a form which is independent of the form by which the data that these digest values describe is stored. The repository data that is used to produce matches with input data is determined to be redundant with the input data.

FIG. 7 is a flowchart illustrating an exemplary method 700 for reducing digests storage consumption in a data deduplication system in which aspects of the present invention may be realized. In other words, the method 700 provides for removing digests of redundant repository data, to make the digests storage consumption correlative to the factored size of the data in the repository, rather than to the total (nominal) data size in the repository in a data deduplication system. The method 700 begins (step 702). The method 700 calculates digest values for input data (step 704). The method 700 uses the digest values of the input data and stored digest values of data stored in a repository to locate matches with the stored data (step 706). The method 700 stores the digest values of the input data in the repository (step 708). The method 700 removes the digest values of the data stored in the repository that is determined to be redundant with the input data (step 710). The method 700 ends (step 712).

Figure 8:
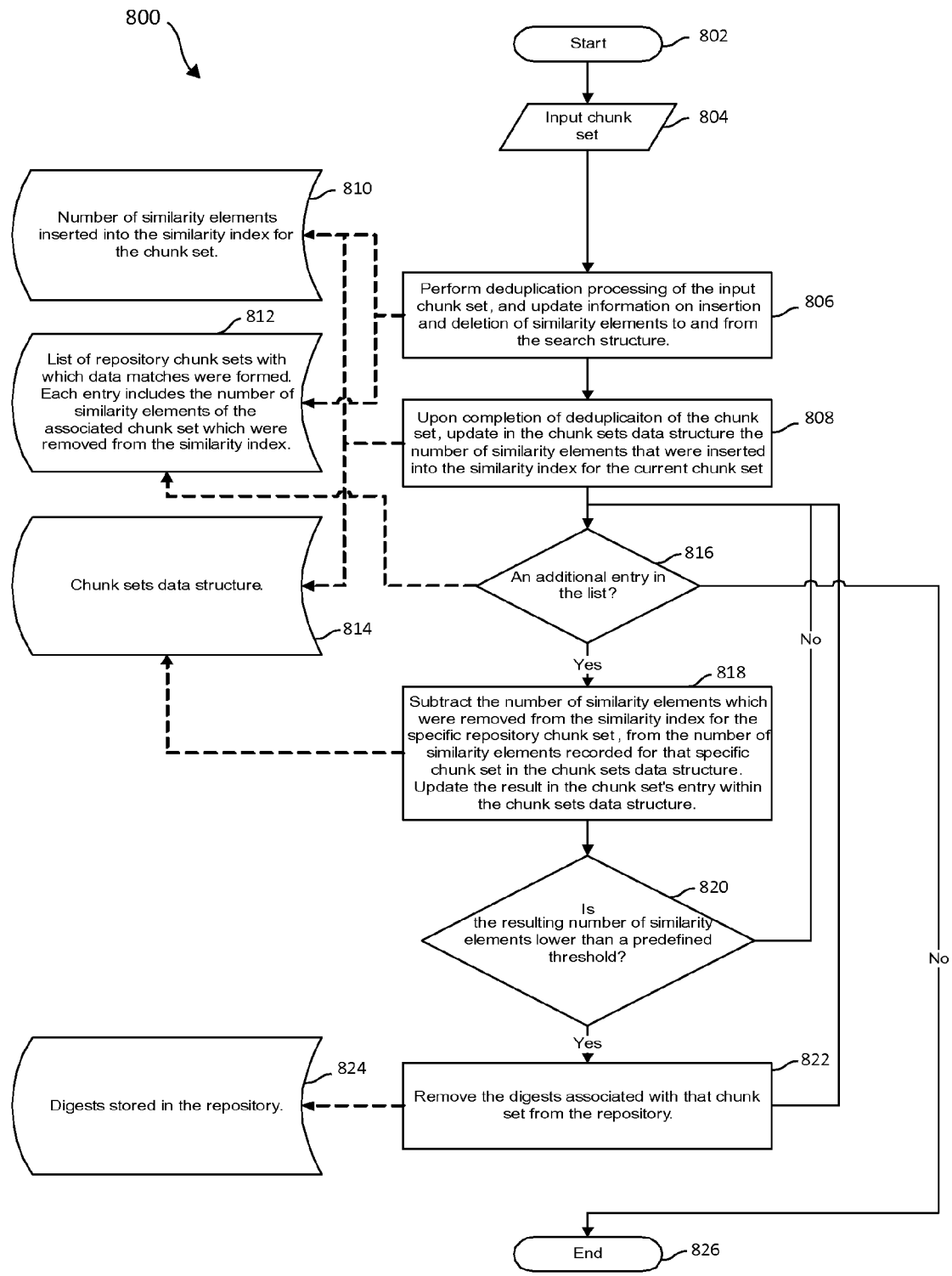
FIG. 8 is a flowchart illustrating an alternative exemplary method for reducing digests storage consumption in a data deduplication system in which aspects of the present invention may be realized.

FIG. 8 is a flowchart illustrating an alternative exemplary method 800 for reducing digests storage consumption in a data deduplication system in which aspects of the present invention may be realized. The method 800 beings (step 802) by partitioning input data into data chunks and grouping the data chunks into data chunk sets (step 804). The method 800 performs deduplication processing of the input data chunk set, and updates the information on insertion and deletion of similarity elements to and from a similarity search structure (e.g., a similarity index) (step 806). During the processing within step 806, the method 800 maintains a record of the number of similarity elements inserted into the similarity search structure for the input chunk set (step 810), and a list is maintained of repository chunk sets with which data matches were formed, wherein each entry in the list includes a number of similarity elements of the associated chunk set that were removed from the similarity search structure (step 812). Next, the method 800 completes the deduplication of the input chunk set, and updates in the chunk sets data structure (step 814) the number of similarity elements (step 810) that were inserted into the similarity search structure for the current input chunk set (step 808). The method 800 then determines if there is an additional entry in the list of step 812 (step 816). If no, the method 800 ends (step 826). If yes, the method 800 subtracts the number of similarity elements that were removed from the similarity search structure for the specific repository chunk set, from the number of similarity elements recorded for that specific chunk set in the chunk sets data structure, and updates the result in the chunk set's entry within the chunk sets data structure of step 814 (step 818). The method 800 then determines if the resulting number of similarity elements is lower than a predefined threshold (step 820). If no, the method 800 returns to step 816. If yes, the method 800 removes the digests associated with chuck set from the repository where digests are stored in step 824 (step 822).

The method 800 then returns to step 816. If the answer on step 816 is no, then the method 800 ends (step 826).

Figure 9:
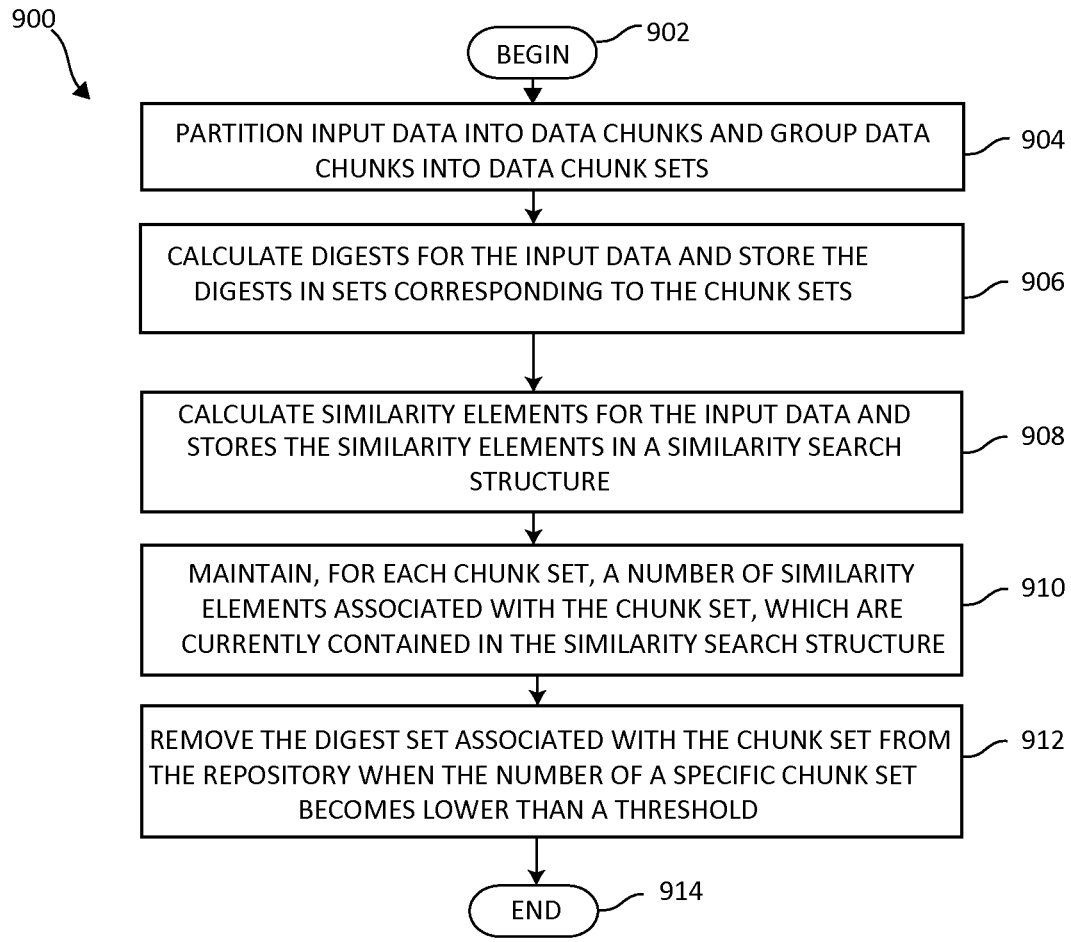
FIG. 9 is a flowchart illustrating an exemplary method 300 for tracking of the number of similarity elements currently in a similarity search structure for removing the digests associated with that chunk set from the repository in a data deduplication system in which aspects of the present invention may be realized.

FIG. 9 is a flowchart illustrating an exemplary method 900 for track of the number of similarity elements of a chunk set currently in a similarity search structure, for removing the digests associated with that chunk set from the repository in a data deduplication system in which aspects of the present invention may be realized. In other words, the method 900 provides for track of the number of similarity elements currently in a similarity search structure, associated with each repository chunk set, and when this number of a specific chunk set becomes lower than a threshold (e.g., a predetermined threshold), removing the digests associated with that chunk set from the repository in a data deduplication system. The method 900 begins (step 902). The method 900 partitions input data into data chunks and groups the data chunks into data chunk sets (step 904). The method 900 calculates digests for the input data and stores the digests in sets corresponding to the chunk sets (step 906). The method 900 calculates similarity elements for the input data and stores the similarity elements in the similarity search structure (step 908). The method 900 maintains, for each chunk set, a number of similarity elements associated with the chunk set, which are currently contained in the similarity search structure (step 910). Then, when this number of a specific chunk set becomes lower than a threshold the digest set associated with that chunk set is removed from the repository (step 912). The method 900 then ends (step 914).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for reducing digests storage consumption by tracking numbers of similarity elements in a similarity search structure in a data deduplication system using a processor device in a computing environment, comprising:
   partitioning, using the processor device, input data into chunks and grouping the chunks into chunk sets, the partitioned chunks each being at least 16 Megabytes (MB) in size;
   calculating, using the processor device, digests for the input data and storing the digests in sets corresponding to the chunk sets;
   calculating, using the processor device, similarity elements for the input data and storing the similarity elements in a similarity search structure;
   maintaining, using the processor device, for each one of the chunk sets a number of the similarity elements associated with the chunk set which are currently contained in the similarity search structure;
   removing, using the processor device, a digests set associated with a chunk set from a repository when the number of similarity elements of that chunk set becomes lower than a predetermined threshold; and
   deduplicating, using the processor device, the input data using the calculated similarity elements of the chunk set from the repository.

2. The method of claim 1, further including defining the chunk sets to be non-overlapping and covering together all of the chunks.

3. The method of claim 1, further including using the similarity elements to find repository data which is similar to the input data.

4. The method of claim 3, further including using input digests and repository digests to calculate data matches.

5. The method of claim 4, further including removing the similarity elements of repository data that was matched with later ingested data from the similarity search structure.

6. The method of claim 5, further including, for each chunk set enclosing matched repository data, subtracting the number of similarity elements which were removed from the similarity search structure for the chunk set from a maintained number of similarity elements in the similarity search structure associated with the chunk set.

7. The method of claim 1, further including storing the digest values in the repository linearly in a sequence of occurrence of the digest values in data.

8. The method of claim 1, further including storing the digest values in the repository in a form that is independent of the form by which the data that the digest values describe is stored.

9. A system for reducing digests storage consumption by tracking numbers of similarity elements in a similarity search structure in a data deduplication system of a computing environment, the system comprising:
- the data deduplication system;
- a repository operating in the data deduplication system;
- a similarity search structure in association with the repository in the data deduplication system; and
- at least one processor device operable in the computing storage environment for controlling the data deduplication system, wherein the at least one processor device:
  - partitions input data into chunks and grouping the chunks into chunk sets, the partitioned chunks each being at least 16 Megabytes (MB) in size,
  - calculates digests for the input data and storing the digests in sets corresponding to the chunk sets,
  - calculates similarity elements for the input data and storing the similarity elements in the similarity search structure,
  - maintains for each one of the chunk sets a number of the similarity elements associated with the chunk set which are currently contained in the similarity search structure,
  - removes a digests set associated with a chunk set from a repository when the number of similarity elements of that chunk set becomes lower than a predetermined threshold, and
  - deduplicates the input data using the calculated similarity elements of the chunk set from the repository.

10. The system of claim 9, wherein the at least one processor device defines the chunk sets to be non-overlapping and covering together all of the chunks.

11. The system of claim 9, wherein the at least one processor device uses the similarity elements to find repository data which is similar to the input data.

12. The system of claim 11, wherein the at least one processor device uses input digests and repository digests to calculate data matches.

13. The system of claim 12, wherein the at least one processor device removes the similarity elements of repository data that was matched with later ingested data from the similarity search structure.

14. The system of claim 13, wherein the at least one processor device, for each chunk set enclosing matched repository data, subtracts the number of similarity elements which were removed from the similarity search structure for the chunk set from a maintained number of similarity elements in the similarity search structure associated with the chunk set.

15. The system of claim 9, wherein the at least one processor device stores the digest values in the repository linearly in a sequence of occurrence of the digest values in data.

16. The system of claim 9, wherein the at least one processor device stores the digest values in the repository in a form that is independent of the form by which the data that the digest values describe is stored.

17. A computer program product for reducing digests storage consumption by tracking the numbers of similarity elements in a similarity search structure in a data deduplication system using a processor device in a computing environment, the computer program product comprising a computer-readable storage medium having computer-readable program code portions stored therein, the computer-readable program code portions comprising:
- a first executable portion that partitions input data into chunks and grouping the chunks into chunk sets, the partitioned chunks each being at least 16 Megabytes (MB) in size;
- a second executable portion that calculates digests for the input data and storing the digests in sets corresponding to the chunk sets;
- a third executable portion that calculates similarity elements for the input data and storing the similarity elements in a similarity search structure;
- a fourth executable portion that maintains for each one of the chunk sets a number of the similarity elements associated with the chunk set which are currently contained in the similarity search structure;
- a fifth executable portion that removes a digests set associated with a chunk set from a repository when the number of similarity elements of that chunk set becomes lower than a predetermined threshold; and
- a sixth executable portion that deduplicates the input data using the calculated similarity elements of the chunk set from the repository.

18. The computer program product of claim 17, further including a seventh executable portion that defines the chunk sets to be non-overlapping and covering together all of the chunks.

19. The computer program product of claim 17, further including a seventh executable portion that uses the similarity elements to find repository data which is similar to the input data.

20. The computer program product of claim 19, further including an eighth executable portion that uses input digests and repository digests to calculate data matches.

21. The computer program product of claim 20, further including a ninth executable portion that removes the similarity elements of repository data that was matched with later ingested data from the similarity search structure.

22. The computer program product of claim 21, further including a tenth executable portion that, for each chunk set enclosing matched repository data, subtracts the number of similarity elements which were removed from the similarity search structure for the chunk set from a maintained number of similarity elements in the similarity search structure associated with the chunk set.

23. The computer program product of claim 17, further including a seventh executable portion that stores the digest values in the repository linearly in a sequence of occurrence of the digest values in data.

24. The computer program product of claim 17, further including a seventh executable portion that stores the digest values in the repository in a form that is independent of the form by which the data that the digest values describe is stored.

* * * * *